(12) United States Patent
Saito et al.

(10) Patent No.: US 9,158,385 B2
(45) Date of Patent: Oct. 13, 2015

(54) INPUT RECEIVER AND ELECTRONIC DEVICE

(71) Applicant: Kabushiki Kaisha Toshiba, Tokyo (JP)

(72) Inventors: Ryo Saito, Tokyo (JP); Yoshinori Kohmoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 234 days.

(21) Appl. No.: 13/718,076

(22) Filed: Dec. 18, 2012

(65) Prior Publication Data

US 2013/0176671 A1    Jul. 11, 2013

(30) Foreign Application Priority Data

Jan. 6, 2012 (JP) ................. 2012-001654

(51) Int. Cl.
*G06F 1/16* (2006.01)
*G06F 3/02* (2006.01)

(52) U.S. Cl.
CPC .............. *G06F 3/0202* (2013.01); *G06F 1/169* (2013.01); *G06F 1/1662* (2013.01)

(58) Field of Classification Search
CPC ...... G06F 1/169; G06F 1/1662; G06F 3/0202
USPC ............ 361/679.08, 679.09, 679.17, 679.55, 361/679.1
See application file for complete search history.

(56) References Cited

U.S. PATENT DOCUMENTS

| | | | |
|---|---|---|---|
| 7,463,203 B2 | 12/2008 | Takeguchi et al. | |
| 7,542,274 B2 | 6/2009 | Minaguchi et al. | |
| 7,544,904 B2 | 6/2009 | Nakatani et al. | |
| 7,729,519 B2 | 6/2010 | Shigenobu et al. | |
| 7,778,016 B2 | 8/2010 | Minaguchi et al. | |
| 7,957,127 B2 | 6/2011 | Minaguchi et al. | |
| 8,077,057 B2 | 12/2011 | Ohshita et al. | |

(Continued)

FOREIGN PATENT DOCUMENTS

| | | |
|---|---|---|
| JP | 2003-216276 | 7/2003 |
| JP | 2005-157789 A | 6/2005 |

(Continued)

OTHER PUBLICATIONS

Notice of Rejection mailed by Japan Patent Office on Mar. 12, 2013 in the corresponding Japanese Patent Application No. 2012-001654, 8 pages.

(Continued)

*Primary Examiner* — Adrian S Wilson
(74) *Attorney, Agent, or Firm* — Knobbe, Martens, Olson & Bear, LLP

(57) ABSTRACT

According to one embodiment, input receiver includes: cover; key module; detector; and button. Second opening is close to one end of the cover. First supporting surface is close to other end of the cover. Recess is between the second opening and the first supporting surface. Second supporting surface is configured to be aligned with the recess in direction intersecting first direction in which the second opening and the first supporting surface are aligned. The key module includes: area including keys separated from one another at first pitch; and area including keys separated from surrounding keys at second pitch shorter than the first pitch. The key module is in contact with the cover. The detector is aligned with the key module in the first direction. Detecting area is covered with portion of the first supporting surface and the second supporting surface.

4 Claims, 15 Drawing Sheets

(56) References Cited

U.S. PATENT DOCUMENTS

| | | |
|---|---|---|
| 8,115,689 B2 | 2/2012 | Takeguchi et al. |
| 8,553,410 B2 | 10/2013 | Tatsukami |
| 8,564,938 B2 | 10/2013 | Horii et al. |
| 2005/0110761 A1 | 5/2005 | Minaguchi et al. |
| 2007/0052691 A1* | 3/2007 | Zadesky et al. ............... 345/173 |
| 2008/0129609 A1 | 6/2008 | Takeguchi et al. |
| 2008/0266143 A1 | 10/2008 | Ohshita et al. |
| 2009/0059487 A1 | 3/2009 | Minaguchi et al. |
| 2009/0059488 A1 | 3/2009 | Minaguchi et al. |
| 2009/0085817 A1 | 4/2009 | Takeguchi et al. |

FOREIGN PATENT DOCUMENTS

| | | |
|---|---|---|
| JP | 2007-173111 | 7/2007 |
| JP | 2008-117212 A | 5/2008 |
| JP | 2009-294944 | 12/2009 |
| JP | 2011-221857 | 11/2011 |
| JP | 2012-181587 | 9/2012 |
| WO | WO 01-31429 A1 | 5/2001 |
| WO | WO2010-119515 | 10/2010 |

OTHER PUBLICATIONS

Notice of Rejection mailed by Japan Patent Office on Jul. 30, 2013 in the corresponding Japanese Patent Application No. 2012-001654, 5 pages.

Decision to Grant a Patent mailed by Japan Patent Office on Oct. 22, 2013 in corresponding Japanese Patent Application No. 2012-001654, 4 pages.

* cited by examiner

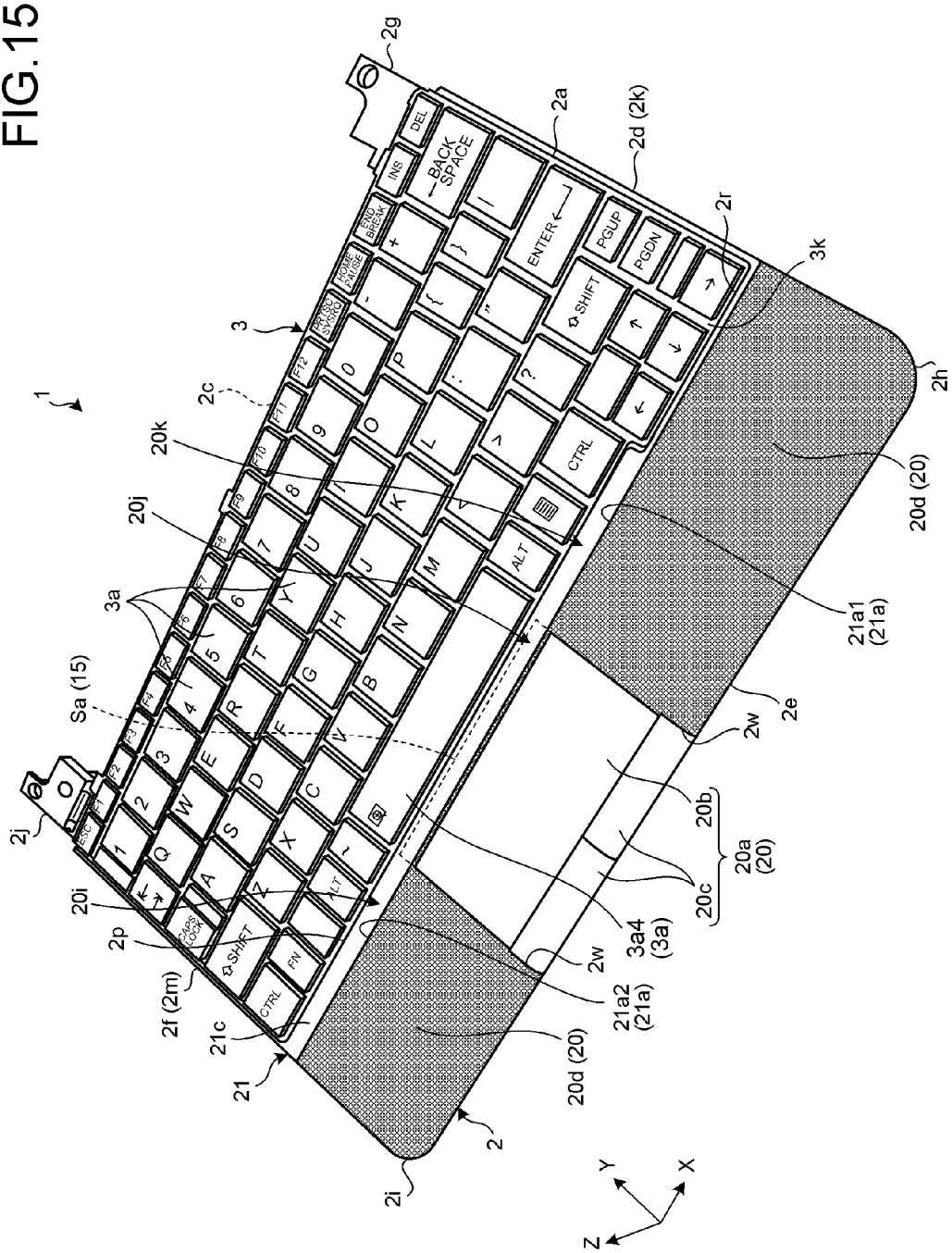

INPUT RECEIVER AND ELECTRONIC DEVICE

CROSS-REFERENCE TO RELATED APPLICATIONS

This application is based upon and claims the benefit of priority from Japanese Patent Application No. 2012-001654, filed on Jan. 6, 2012, the entire contents of which are incorporated herein by reference.

FIELD

An embodiment described herein relates generally to an input receiver and an electronic device.

BACKGROUND

Conventionally known is an input receiver with a plurality of keys exposed through an opening provided on a wall portion.

For an input receiver of this type, it is desirable that the ease of key typing be not impaired even when the unit is downsized.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 15 is an exemplary perspective view of an input receiver according to a modification.

DETAILED DESCRIPTION

In general, according to one embodiment, an input receiver comprises: a cover; a key module; a detector; and a button. The cover comprises: one end; and other end provided with a first opening. A second opening is close to a side of the one end. A first supporting surface is close to a side of the other end. A recess is between the second opening and the first supporting surface. A second supporting surface is configured to be aligned with the recess in a direction intersecting a direction in which the second opening and the first supporting surface are aligned. The key module comprises: a first area comprising a plurality of first keys separated from one another at a first pitch along a longer direction; and a second area configured to align with the first area in the longer direction, and comprising second keys separated from surrounding keys at a second pitch shorter than the first pitch along the longer direction. The key module is configured to be in contact with the cover at a position where the first keys and the second keys are exposed through the second opening. The detector is configured to be aligned with the key module in a direction in which the second opening and the first supporting surface are aligned. A detecting area capable of detecting an external input operation is covered with a portion of the first supporting surface and a portion of the second supporting surface. A receiving portion, which is capable of receiving an external input operation, is exposed from the first opening. A support portion configured to support the receiving portion is configured to be covered with the detector.

In each of the drawings, directions (an X direction, a Y direction, and a Z direction) are indicated for convenience. The X direction is a longer direction of a key module, the Y direction is a shorter direction of the key module, and the Z direction is a frontal direction (an upper direction or an in/out direction) of the key module. The X direction, the Y direction, and the Z direction are orthogonal to one another.

In a first embodiment in the following, a so-called notebook personal computer is exemplified as an electronic device. However, the electronic device according to the first embodiment only needs to be configured so that an input receiver is mountable thereto (able to be integrated therewith), and is not limited to the notebook.

Figure 1:
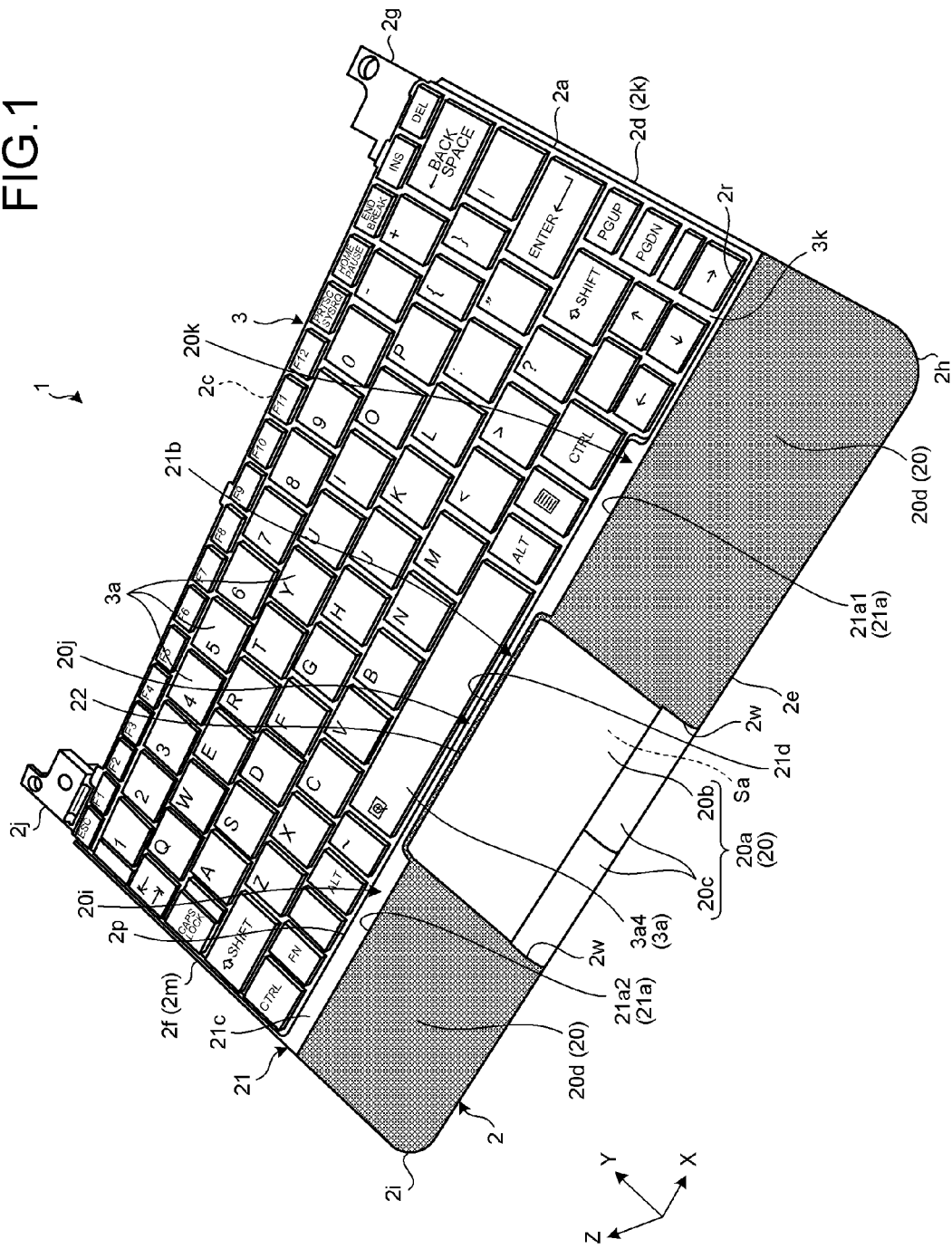
FIG. 1 is an exemplary perspective view of an input receiver according to a first embodiment.
Figure 2:
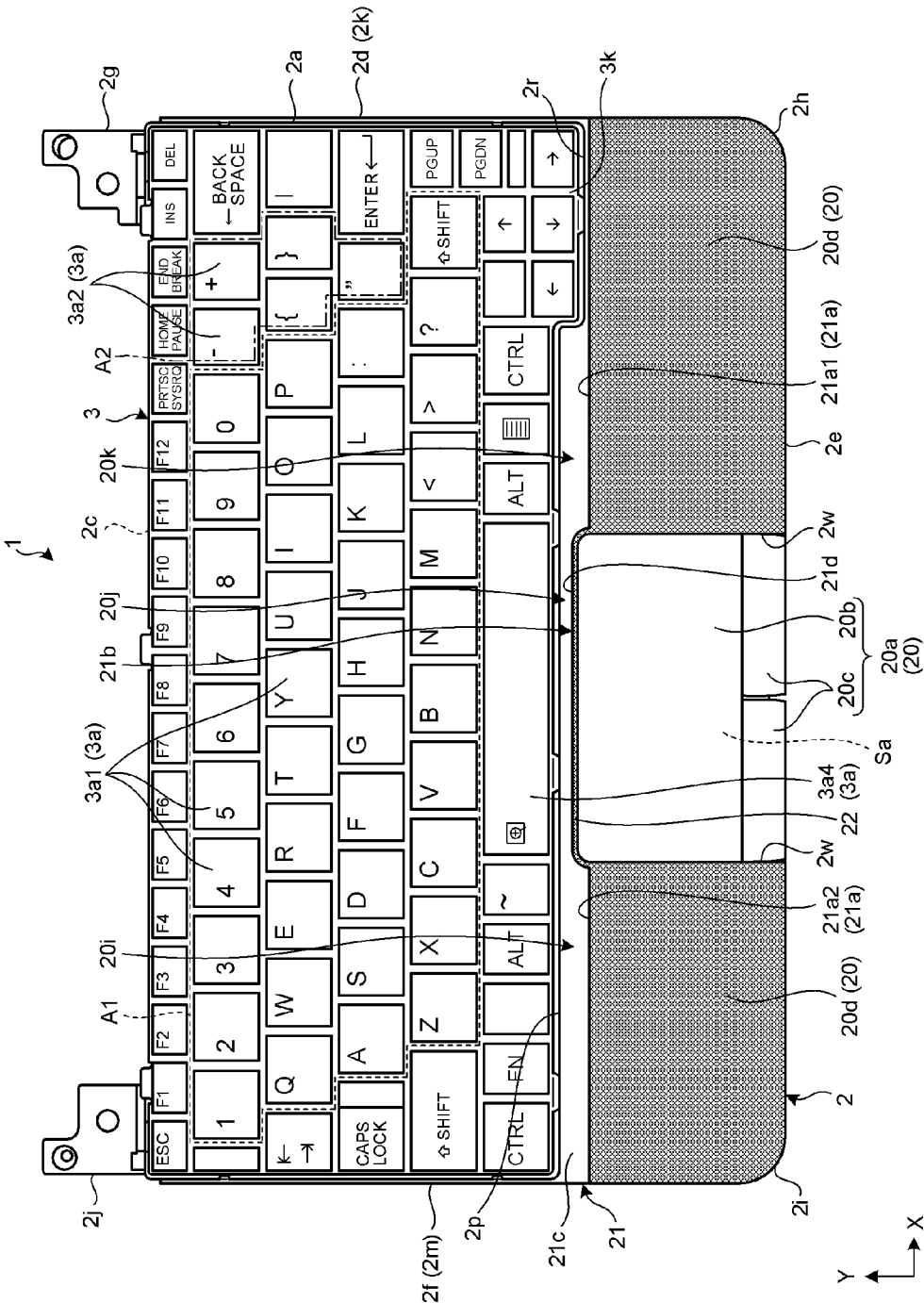
FIG. 2 is an exemplary plan view of the input receiver in the first embodiment.

In the first embodiment, as an example, as illustrated in FIGS. 1 and 2, an input receiver 1 comprises a wall portion 2 (a first wall portion, a supporting member, a first member, a housing member, a housing, a cover portion, or a housing cover) and a key module 3 (an input device, an operation input module, or an input module). On the wall portion 2, an opening 2a (a recess, a second opening, or a first receiving portion) is provided. The key module 3 is attached to the wall portion 2 so as to be accommodated in the opening 2a. Under this condition, a plurality of keys 3a of the key module 3 are exposed through the opening 2a.

In the first embodiment, as an example, as illustrated in FIGS. 1 to 4, the wall portion 2 is formed in a quadrangular shape (a rectangular shape, as an example, in the first embodiment). The wall portion 2 comprises, in a planar view (a frontal view in FIG. 2), four end portions 2c to 2f (sides or edge portions) and four corners 2g to 2j (protruding portions, rounded portions, or end portions). The end portions 2c and 2e are both ends of the wall portion 2 in the shorter direction and are examples of longer sides. The end portions 2d and 2f are both ends of the wall portion 2 in the longer direction and are examples of shorter sides. The end portions 2c and 2e extend between the end portions 2*d* and 2*f* and intersect (orthogonally, as an example, in the first embodiment) with the end portions 2*d* and 2*f*. The end portions 2*d* and 2*f* extend between the end portions 2*c* and 2*e* and intersect (orthogonally, as an example, in the first embodiment) with the end portions 2*c* and 2*e*.

Figure 3:
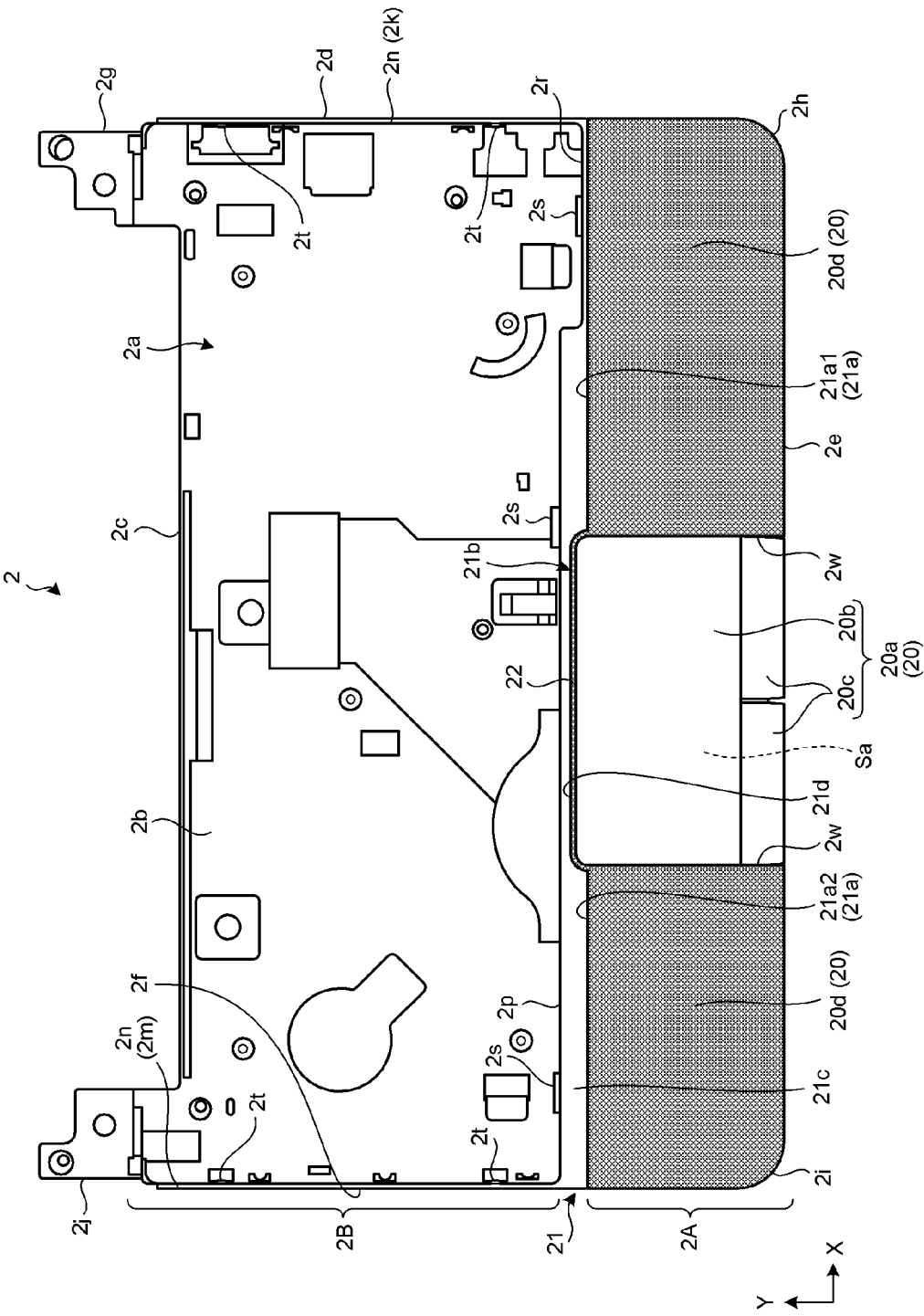
FIG. 3 is an exemplary plan view of a wall portion of the input receiver in the first embodiment.
Figure 4:
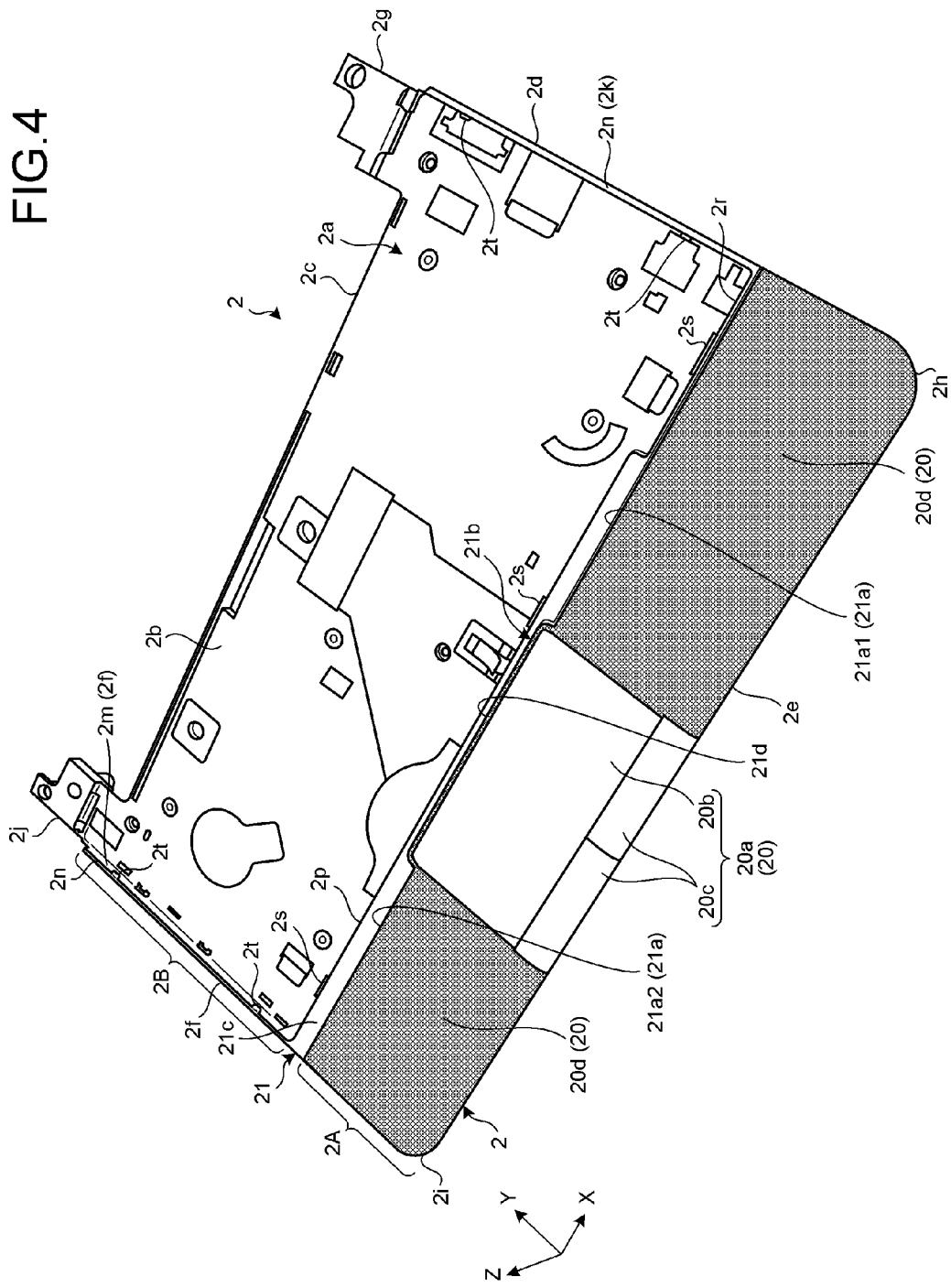
FIG. 4 is an exemplary perspective view of the wall portion of the input receiver in the first embodiment.

In the first embodiment, as an example, as illustrated in FIGS. 3 and 4, the opening 2*a* in a quadrangular shape (a rectangular shape, as an example, in the first embodiment) is provided on the wall portion 2. The opening 2*a* is positioned close to the end portion 2*c* on one end side of the wall portion 2 in the shorter direction (upper side in FIGS. 1 to 4), and is constructed as a recess extending between the end portions 2*d* and 2*f*. On the end portions 2*d* and 2*f* on both sides of the opening 2*a* in the longer direction, wall portions 2*k* and 2*m* (side walls) are provided. The wall portions 2*k* and 2*m* have an approximately uniform height and extend along the end portions 2*d* and 2*f*, respectively. On the back side of the opening 2*a*, a wall portion 2*b* is provided. The wall portion 2*b* (a bottom wall) is provided in a tabular shape extending between the wall portions 2*k* and 2*m* (between the end portions 2*d* and 2*f*).

Figure 5:
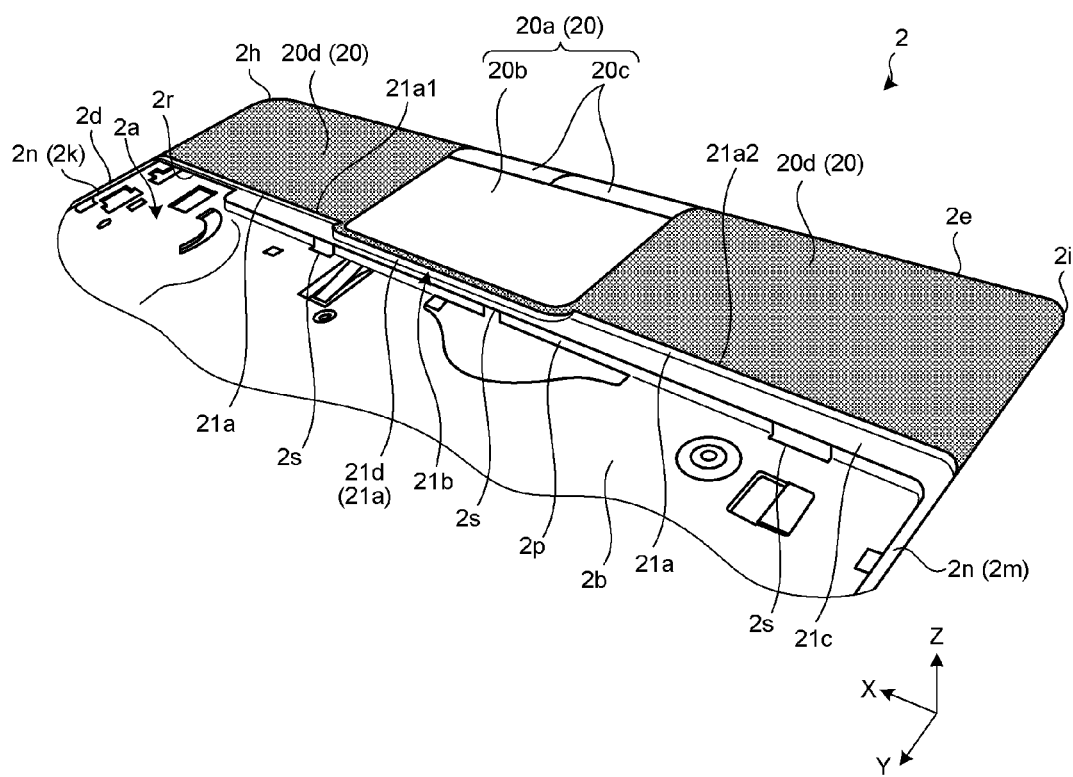
FIG. 5 is an exemplary perspective view of the wall portion of the input receiver as viewed from an angle different from that in FIG. 4, in the first embodiment.
Figure 6:
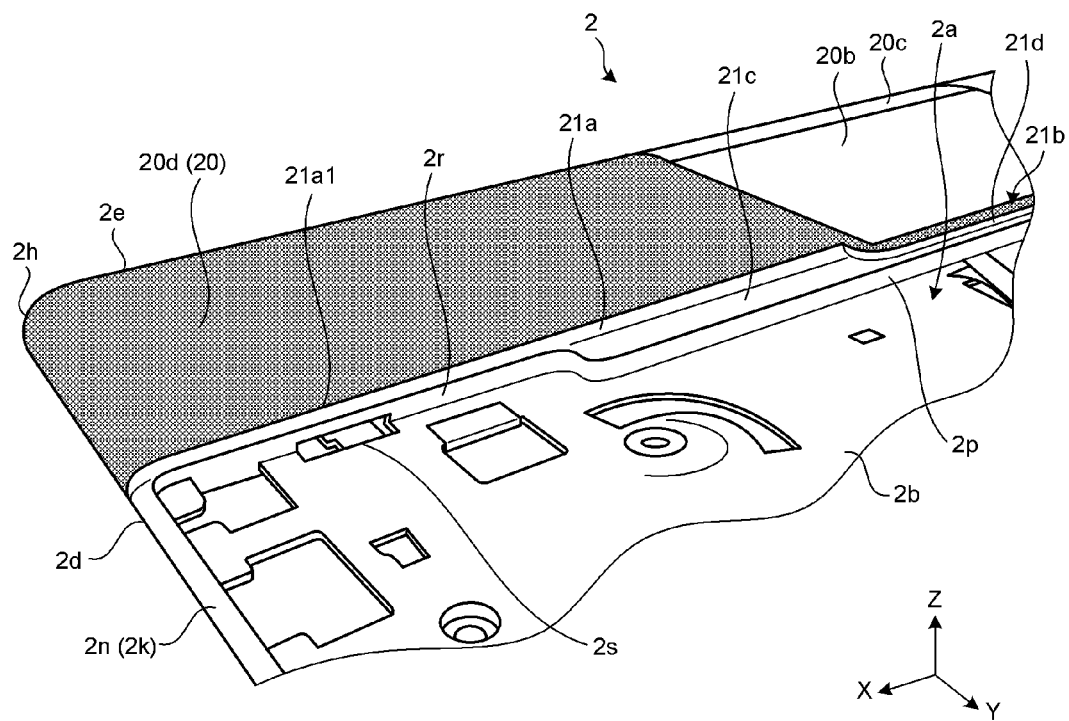
FIG. 6 is an exemplary perspective view of a portion of the wall portion of the input receiver in the first embodiment.
Figure 7:
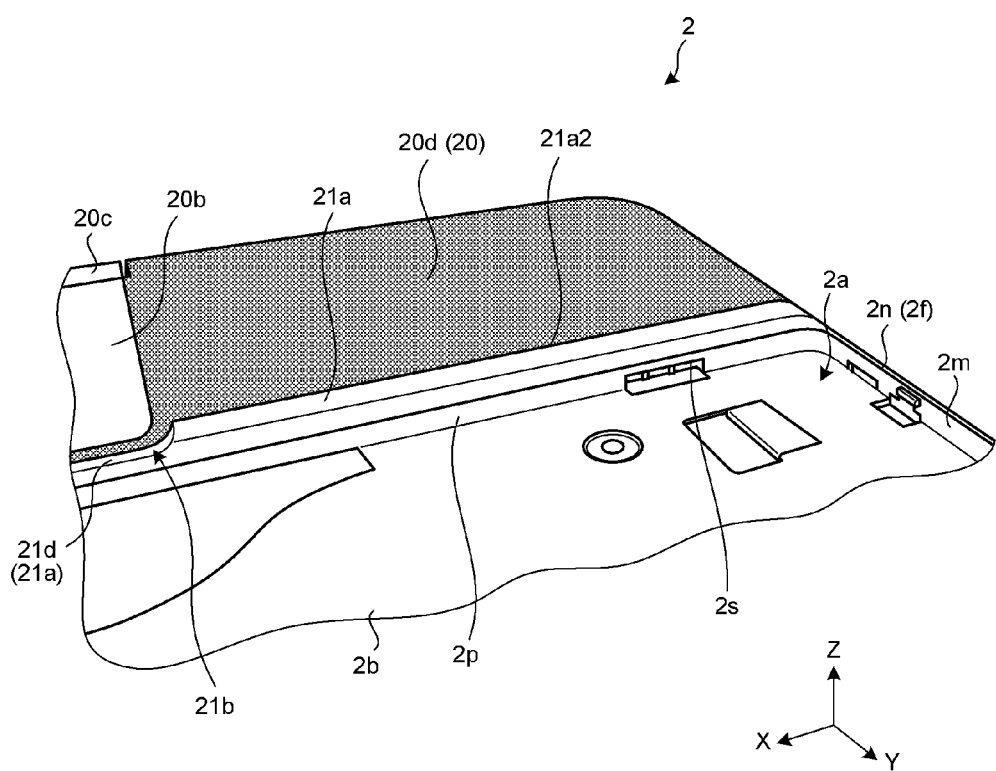
FIG. 7 is an exemplary perspective view of another portion of the wall portion of the input receiver, which is different from that in FIG. 6, in the first embodiment.

In the first embodiment, as an example, as illustrated in FIGS. 1 to 4, a surface 20 (a first supporting surface portion or a surface portion) in a quadrangular shape (a rectangular shape, as an example, in the first embodiment) is provided close to the end portion 2*e* on the other end side of the wall portion 2 in the shorter direction (lower side in FIGS. 1 to 3). The surface 20 extends between the end portions 2*d* and 2*f* in an elongated belt-like shape along the end portion 2*e*. At a center of the surface 20 in the longer direction (the X direction), a square shaped operation input module 20*a* (an input module) is provided. The operation input module 20*a* comprises a touch pad 20*b* (an operation input module, a pointing device, a receiving surface, or a second receiving module) in a quadrangular shape (a rectangular shape, as an example, in the first embodiment) positioned on the opening 2*a* side (on the end portion 2*c* side), and a plurality of click buttons 20*c* (operation input modules or buttons) in a quadrangular shape (a rectangular shape, as an example, in the first embodiment) positioned on the side opposite the opening 2*a* (on the end portion 2*e* side opposite the end portion 2*c*). The click buttons 20*c* (two buttons, as an example, in the first embodiment) are arranged so as to be aligned along the end portion 2*e*. The width of the portion of the surface 20 corresponding to the operation input module 20*a* (the length along an up/down direction in FIGS. 2 and 3) is wider than those of the other portions (the portions on both end sides in the longer direction). The surface 20 projects towards the end portion 2*c* side (the opening 2*a* side) at the portion corresponding to the operation input module 20*a* (the touch pad 20*b*). Accordingly, in the first embodiment, as an example, as also illustrated in FIGS. 5 to 7, a projecting portion 21*b* projecting towards the end portion 2*c* side at a wall portion 21*a* of a boundary portion 21 between the surface 20 and the opening 2*a* is provided. The surface (a face, a top surface, or an outer surface) of the wall portion 21*a* can be constructed as an inclined plane (a slant face or a curved surface). In the first embodiment, as an example, the surface of the wall portion 21*a* corresponding to groove portions 20*i* and 20*k* is formed as an inclined plane.

In the first embodiment, as an example, as illustrated in FIGS. 1 to 4, on both sides of the operation input module 20*a* of the surface 20 (on both end sides in the longer direction), palm rests 20*d* (placement portions) are provided. The palm rests 20*d* are portions on which a user of the key module 3 or an electronic device 10 (see FIG. 10) places his/her hands and wrists, and are constructed in a planar shape (a plate-like shape). However, on the end portions 2*d* and 2*f* and the corners 2*h* and 2*i* of the palm rests 20*d*, curved portions are provided. The surface 20 is generally formed in a bulged shape bulging towards the central portion away from the end portions 2*d* to 2*f* and the corners 2*h* and 2*i* in the frontal view. However, the curved portions can only be at the portions of the end portions 2*d* to 2*f* and the corners 2*h* and 2*i*, and the central portion side except for the end portions 2*d* to 2*f* and the corners 2*h* and 2*i* in the frontal view can be formed in a planar shape. The operation input module 20*a* may comprise the touch pad 20*b* along a planar surface and the click buttons 20*c* along a curved surface.

As in the foregoing, in the first embodiment, as an example, as illustrated in FIGS. 3 and 4, the wall portion 2 comprises: a first part 2A in a quadrangular shape in frontal view (a rectangular shape, as an example, in the first embodiment) positioned close to the end portion 2*e* and provided with the surface 20; a second part 2B in a quadrangular shape in frontal view (a rectangular shape, as an example, in the first embodiment) positioned close to the end portion 2*c* and provided with the opening 2*a*; and the boundary portion 21 between the first part 2A and the second part 2B.

Figure 11:
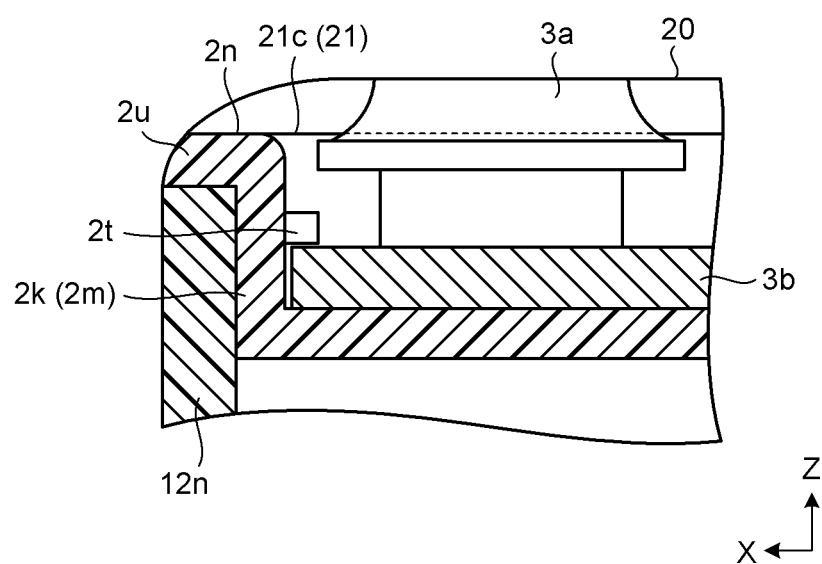
FIG. 11 is an exemplary cross-sectional view taken along the line XI-XI in FIG. 10, in the first embodiment.

In such a configuration, in the first embodiment, as an example, as also illustrated in FIG. 11, a surface 21*c* (a second surface) of the boundary portion 21 and a top portion 2*n* (an end portion, an upper end portion, or a top surface) of the second part 2B are positioned at about the same height in a thickness direction of the input receiver 1 (the Z direction). The position of the surface 20 in the thickness direction is higher than the positions of the surface 21*c* and the top portion 2*n*. In other words, the surface 20, i.e. the first part 2A, projects in the thickness direction of the input receiver 1 as compared with the second part 2B. The wall portion 2*b* positioned at the bottom of the opening 2*a* is lower than the positions of the surface 21*c* and the top portion 2*n*. In other words, the opening 2*a* is recessed to the side opposite the surface 20 in the thickness direction. The boundary portion 21 can be referred to as a stepped portion (a step). In the first embodiment, as an example, because the boundary portion 21 extending between the end portions 2*d* and 2*f* along the longer direction is constructed as a stepped portion between the first part 2A and the second part 2B, the second moment of area of the wall portion 2 at the boundary portion 21 is more likely to increase, whereby the rigidity of the wall portion 2 is likely to be improved. More specifically, in the first embodiment, as an example, the boundary portion 21 serves as a beam extending between the end portions 2*d* and 2*f* along the longer direction. As illustrated in FIG. 11, the top portions of the keys 3*a* and the surface 20 are positioned at about the same height in the thickness direction of the input receiver 1 (the Z direction). Consequently, as an example, the user can easily operate the keys 3*a* in a condition where his/her hands and wrists are placed on the surface 20.

In the first embodiment, as an example, the second part 2B where the key module 3 is mounted can be constructed to be lower than the first part 2A. Accordingly, in the first embodiment, as an example, as illustrated in FIG. 11, because the keys 3*a* close to (facing) the end portions 2*d* and 2*f* project higher (in the thickness direction) than the wall portions 2*k* and 2*m* of the second part 2B, the wall portions 2*k* and 2*m* are not likely to interfere with the input operation (a pressing operation or depressing) of the keys 3*a*. Consequently, as an example, even when the keys 3*a* close to (facing) the end portions 2*d* and 2*f* are made smaller, the operability of the keys 3*a* is likely to be ensured.

In the first embodiment, as an example, as illustrated in FIGS. 5 to 7, the boundary portion 21 is provided with the wall portion 21a. As described above, in the first embodiment, as an example, the portion of the wall portion 21a corresponding to the operation input module 20a (the touch pad 20b) is provided with the projecting portion 21b. In the first embodiment, as an example, the rigidity of the wall portion 2 at the boundary portion 21 is likely to be increased because of the projecting portion 21b as compared with the case where the boundary portion 21 is formed linearly without the projecting portion 21b.

Figure 8:
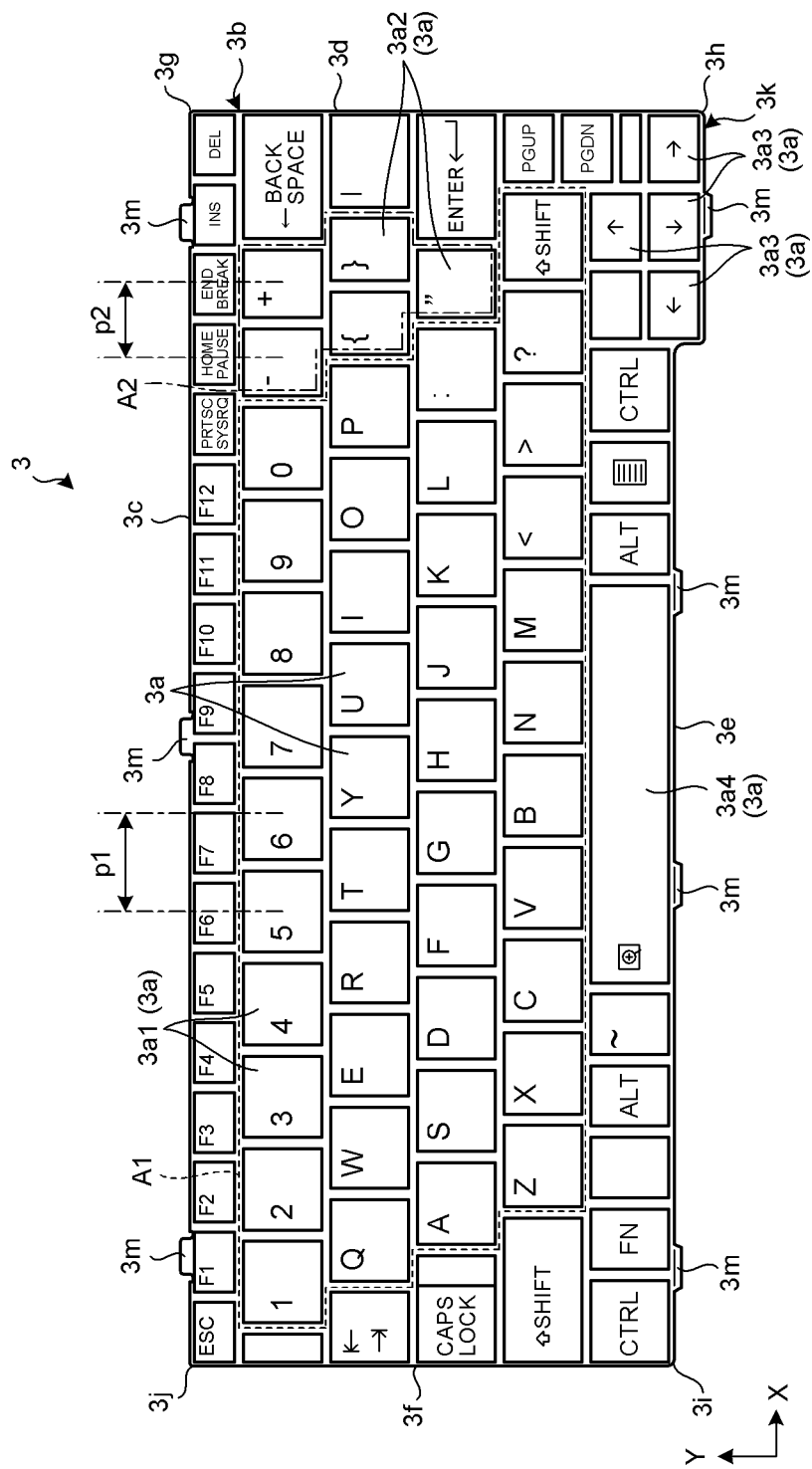
FIG. 8 is an exemplary plan view of a key module of the input receiver in the first embodiment.

In the first embodiment, as an example, as illustrated in FIGS. 1 to 6, on the end portion 2d side of the boundary portion 21, a cutout portion 2r where an edge portion 2p of the opening 2a is recessed towards the end portion 2e side is provided. As illustrated in FIG. 8, corresponding to the cutout portion 2r, a projecting portion 3k is provided to the key module 3. In the projecting portion 3k, keys 3a3 (3a) are also positioned. In accordance with the first embodiment, as an example, providing the cutout portion 2r makes the keys 3a (or an area to place the keys 3a) expand towards the end portion 2e side, whereby the key module 3, eventually the input receiver 1, is likely to be prevented from expanding in the longer direction.

In the first embodiment, as an example, as illustrated in FIG. 5, an edge portion 21a1 (a first edge portion) on the side where the cutout portion 2r is provided (on the end portion 2d side) out of the edge portion (the wall portion 21a) of the surface 20 on the end portion 2c side (see FIGS. 3 and 4) opposite the end portion 2e is positioned further towards the end portion 2e side than the cutout portion 2r. As illustrated in FIGS. 3 to 5, an edge portion 21a2 (a second edge portion) on the side where the cutout portion 2r is not provided (on the end portion 2f side or the side opposite to the cutout portion 2r across the projecting portion 21b) is provided at a position where a straight line is formed with the edge portion 21a1. An edge portion 21d of the projecting portion 21b is positioned further towards the end portion 2c side than the edge portions 21a1 and 21a2. Furthermore, in the first embodiment, as an example, the edge portion 2p of the opening 2a on the end portion 2e side extends to the both sides of the projecting portion 21b corresponding to the operation input module 20a (the touch pad 20b) in the longer direction (the X direction) straddling the projecting portion 21b and is formed linearly along the longer direction. By such a configuration, in the first embodiment, as an example, the edge portions 21a1 and 21a2 are separated from the edge portion 2p of the opening 2a on the end portion 2e side, and groove portions 20i, 20j, and 20k (recess) extending along the longer direction (the X direction) are formed between the keys 3a of the key module 3 exposed through the opening 2a and the surface 20. This makes it easier to prevent the fingers of the user and such from moving from the surface 20 side towards the keys 3a side. Moreover, as an example, the area between the edge portion 2p and the edge portions 21a1 and 21a2 (i.e., the boundary portion 21) can be used more effectively as an area to arrange the operation input module 20a (the touch pad 20b) and the keys 3a (an area to be expanded or an area where a part thereof is present). For example, appearance is likely to be improved with the edge portion 2p and the edge portions 21a1 and 21a2 lined up linearly.

In the first embodiment, as an example, as illustrated in FIGS. 1 to 4, the projecting portion 21b corresponding to the operation input module 20a (the touch pad 20b) is facing the key 3a (a space key 3a4) that is longer than the other keys 3a in the longer direction (the longest in the longer direction, as an example, in the first embodiment). Therefore, in accordance with the first embodiment, as an example, the keys 3a adjacent to the space key 3a4 (the keys 3a other than the space key 3a4) are likely to be prevented from being operated by the fingers and such operating the touch pad 20b. A surface 22 corresponding to the projecting portion 21b (a top surface, a surface, or a second supporting surface portion) is positioned on the opening 2a side of the touch pad 20b and is aligned with the groove portions 20i and 20k in a direction (the X direction) intersecting a direction (the Y direction) in which the opening 2a and the palm rests 20d (placement portions or supporting surfaces) are aligned. The surface 22 and the surface 20 are aligned on the same plane, i.e., being flush with each other.

In the first embodiment, as an example, as illustrated in FIG. 8, the key module 3 is formed in a quadrangular shape (a rectangular shape, as an example, in the first embodiment). The key module 3 comprises a plate-like supporting member 3b (a supporting portion, a sheet, a cover, a base, a plate, or a frame) in a quadrangular shape (a rectangular shape, as an example, in the first embodiment), and the keys 3a (operating portions or operators) supported to go in and out (to project and retract, to be displaceable, or to go forward and back) on a surface (not depicted) on one side of the supporting member 3b. The keys 3a are held in a projected state (in a raised state) by resilient members not illustrated, and are retracted (lowered) by a push operation (a compressing operation, a depressing operation, or a holding-down operation) with the fingers and such. When the keys 3a are compressed, signals corresponding to such keys 3a (input signals) are output.

In the first embodiment, as an example, the key module 3 (the supporting member 3b) comprises, in a planar view (in a frontal view in FIG. 8), four end portions 3c to 3f (sides or edge portions) and four corners 3g to 3j (protruding portions, rounded portions, or end portions). The end portions 3c and 3e are both ends of the key module 3 in the shorter direction and are examples of longer sides. The end portions 3d and 3f are both ends of the key module 3 in the longer direction and are examples of shorter sides. The end portions 3c and 3e extend between the end portions 3d and 3f and intersect (orthogonally, as an example, in the first embodiment) with the end portions 3d and 3f. The end portions 3d and 3f extend between the end portions 3c and 3e and intersect (orthogonally, as an example, in the first embodiment) with the end portions 3c and 3e.

In the first embodiment, as an example, as illustrated in FIG. 8, on the key module 3, the keys 3a in a quadrangular shape (in a square shape or a rectangular shape) aligned along the longer direction (the X direction) in a planar view are arranged in a plurality of rows (six rows, as an example, in the first embodiment) in the shorter direction (the Y direction). The key module 3 in the first embodiment comprises a first area A1 in which a plurality of keys 3a1 (3a, first keys) are aligned along the longer direction at a constant pitch p1 (a distance between the centers of the keys 3a or a first pitch), and a second area A2 in which a pitch p2 (a distance between the centers of the keys 3a or a second pitch) of keys 3a2 (3a, second keys) positioned on the end side of the first area A1 in the longer direction and adjacent to one another is shorter than the pitch in the first area A1. Consequently, as an example, at least for the first area A1, the keys 3a are made easier to operate and erroneous operations of the keys 3a are likely to be prevented. In the first embodiment, as an example, the keys 3a that input alphabets A to Z and numbers 0 to 9 are included in the first area A1. The second area A2 may be referred to as an area that includes the keys 3a2 having a length shorter (smaller) in the longer direction (the X direction) than the length of the keys 3a1 in the first area A1.

In the first embodiment, as an example, the key module 3 is provided with the projecting portion 3k where the end portion 3e on the end portion 3d side projects partly. In the projecting portion 3k, the keys 3a3 (+ key, cursor keys, scroll keys, navigation keys, and in the first embodiment, as an example, ← key, ↑ key, ↓ key, and → key) are arranged. As illustrated in FIG. 2, on the end portion 2d side of the edge portion 2p of the opening 2a on the end portion 2e side, the cutout portion 2r corresponding to (accommodating) the projecting portion 3k is provided.

In the first embodiment, as an example, on the end portions 3c and 3e of the key module 3, engaging portions 3m (claw portions, bosses, protrusions, or projecting portions) are provided. On the wall portion 2, engaging portions 2s (holes or recesses, see FIG. 5) corresponding to the engaging portions 3m are provided. On the wall portion 2, engaging portions 2t (claw portions, bosses, protrusions, or projecting portions, see FIG. 3) are further provided. In the first embodiment, as an example, the engaging portions 3m engage with the engaging portions 2s and the supporting member 3b engages with the engaging portions 2t to integrate the key module 3 with the wall portion 2.

Figure 9:
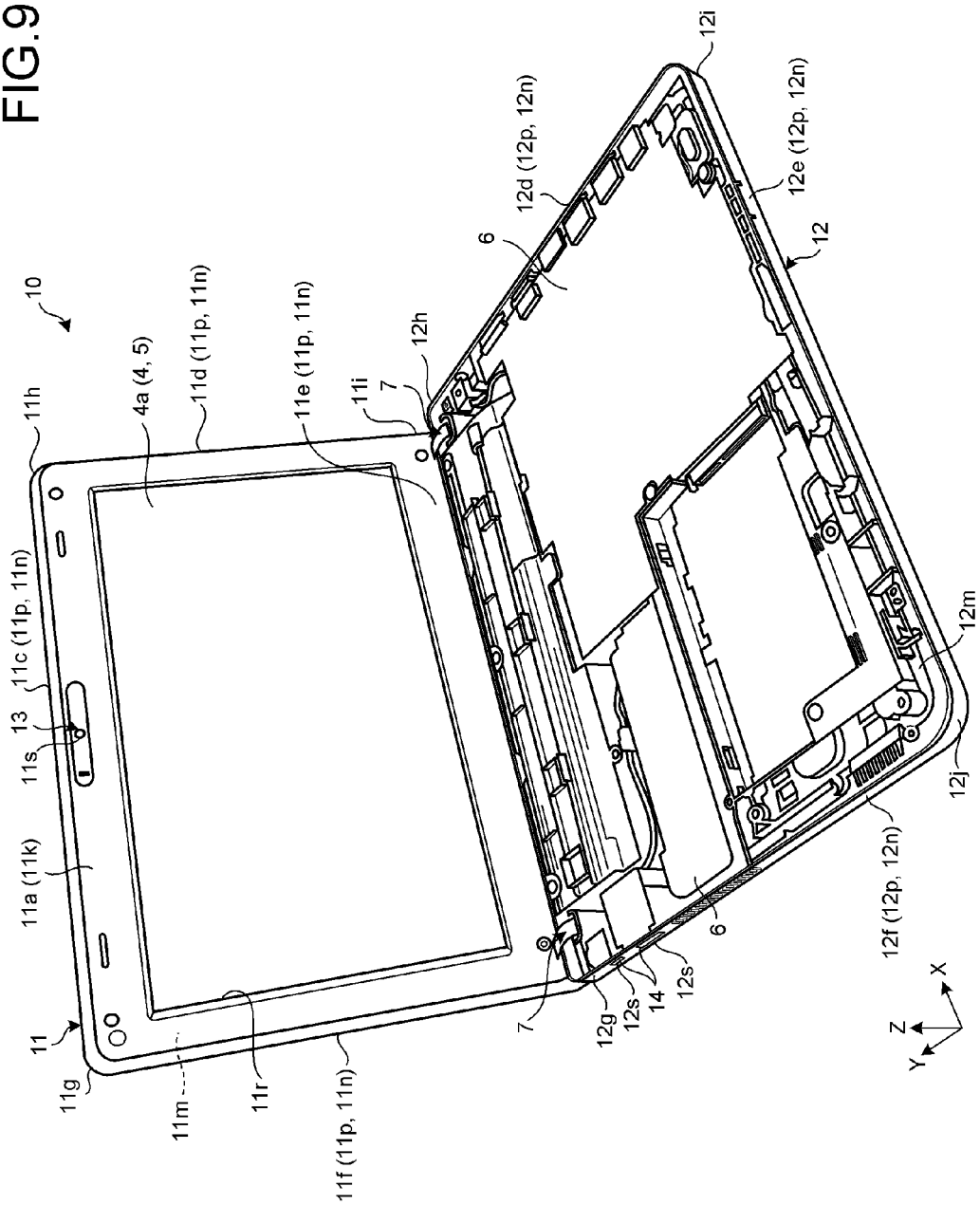
FIG. 9 is an exemplary perspective view of an electronic device to which the input receiver is not attached, in the first embodiment.
Figure 10:
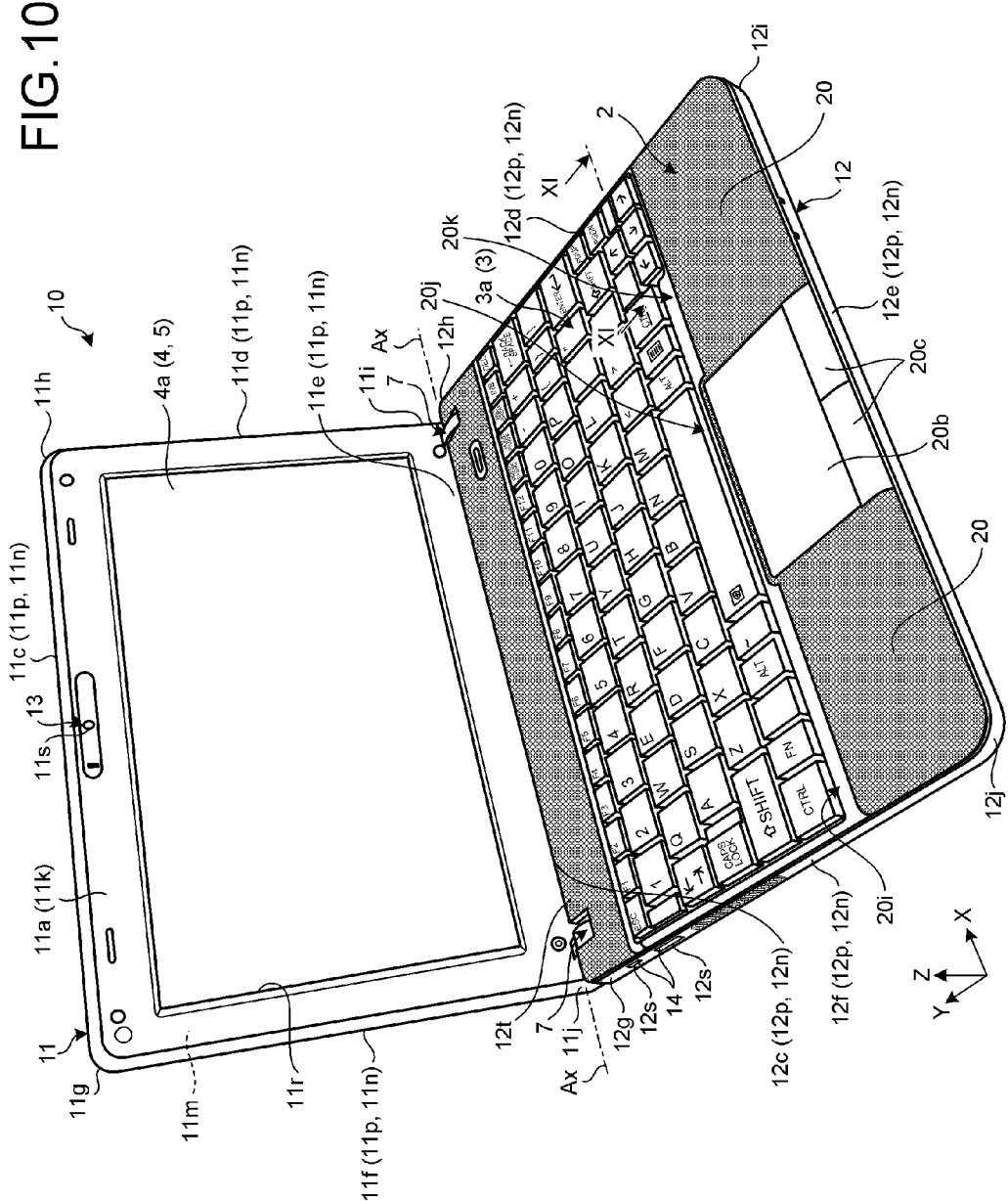
FIG. 10 is an exemplary perspective view of the electronic device to which the input receiver is attached, in the first embodiment.

In the first embodiment, as an example, as illustrated in FIGS. 9 and 10, the input receiver 1 in which the key module 3 is integrated with the wall portion 2 is attached to (mounted on) the electronic device 10. The input receiver 1 is attached to the electronic device 10, for example, by binding tools (as an example, screws not depicted) or a snap-fit mechanism. In the first embodiment, as an example, the electronic device 10 is configured as a so-called notebook personal computer. The electronic device 10 comprises a first housing 11 and a second housing 12. Specifically, the first housing 11 (a first portion) houses at least a part of a display device 4. The second housing 12 houses substrates 6 (see FIG. 9). On the second housing 12, the input receiver 1 is fitted.

The first housing 11 and the second housing 12 are rotatably connected by a hinge portion 7 (a connecting portion, a coupling portion, a rotatably supporting portion, a hinge mechanism, a connecting mechanism, a coupling mechanism, or a rotatably supporting mechanism). The first housing 11 and the second housing 12 are rotatably connected by the hinge portion 7 at least between an expanded state illustrated in FIG. 10 and a folded state not depicted. In the first embodiment, as an example, the hinge portion 7 connects the first housing 11 and the second housing 12 such that the housings are rotatable about a rotation axis Ax. A display screen 4a of the display device 4 is exposed through an opening 11r provided on a front surface 11a (a frontal surface, a front face, a first surface, or a first face portion) of the first housing 11. In a folded state, the first housing 11 and the second housing 12 overlap with each other, and the display screen 4a, the key module 3, the touch pad 20b, the click buttons 20c, and others are hidden by the first housing 11 and the second housing 12. In an expanded state, the display screen 4a, the key module 3, the touch pad 20b, the click buttons 20c, and others are available for use (become visible or operational).

The first housing 11, in the first embodiment, as an example, as illustrated in FIGS. 9 and 10, is configured in a quadrangular shape (a rectangular shape, as an example, in the first embodiment) in a frontal view and in a back view. The first housing 11, in the first embodiment, as an example, is configured as a flat rectangular parallelepiped shape. The first housing 11 comprises the front surface 11a (a surface, a frontal surface, a front face, a first surface, or a first face portion) and a rear surface (a surface, a back surface, a second surface, or a second face portion, not depicted) on the opposite side of the front surface 11a. The front surface 11a and the rear surface are approximately in parallel with each other. The first housing 11 further comprises four end portions 11c to 11f (sides or edge portions) and four corners 11g to 11j (protruding portions, rounded portions, or end portions). The end portions 11c and 11e are examples of longer sides. The end portions 11d and 11f are examples of shorter sides.

The first housing 11 further comprises a wall portion 11k (a first portion, a plate, a frame, a front wall portion, a surface wall portion, or a top wall portion) having the front surface 11a and a wall portion 11m (a second portion, a plate, a rear wall portion, a back wall portion, or a bottom wall portion) having the rear surface. The wall portion 11k is in a rectangular-like shape (a rectangular shape, as an example, in the first embodiment). The first housing 11 comprises four wall portions 11n (third portions, plates, side wall portions, end wall portions, standing wall portions, or span portions) having surfaces 11p (side surfaces, circumferential surfaces, or third surfaces) extending between the wall portion 11k and the wall portion 11m. On the wall portion 11k, the opening 11r in a quadrangular shape, as an example, is provided. Therefore, the wall portion 11k is in a quadrangular shape and in a frame shape. The first housing 11 can be composed of metallic or synthetic resin material, for example.

In the first embodiment, as an example, on the front surface 11a of the first housing 11, a camera module 13 (a camera or an imaging device) can be provided. The camera module 13 is exposed through an opening 11s provided on the wall portion 11k of the first housing 11. On the surfaces 11p of the first housing 11, connectors and operating portions can be provided.

In the first embodiment, as an example, the display screen 4a of the display device 4 (a display module, a display, or a panel) positioned on the front surface 11a side is exposed towards the front (outside) of the first housing 11 through the opening 11r. The user can view the display screen 4a through the opening 11r from the frontal side. The display device 4 is configured in a quadrangular shape (a rectangular shape, as an example, in the first embodiment) in a frontal view. The display device 4 is further configured as a rectangular parallelepiped shape being thin and flat in a front/back direction. The display device 4, for example, is a liquid crystal display (LCD) or an organic electro-luminance display (OELD).

In the first embodiment, as an example, on the front side (a surface side or the wall portion 11k side) of the display device 4, an input operation panel 5 (as an example, a touch-screen, a touch sensor, or an operation surface) is provided. The input operation panel 5 is configured in a transparent and relatively thin quadrangular shape covering the display screen 4a. An operator (for example, a user) can execute input process by performing an operation of touching, pressing, or rubbing the input operation panel 5 with a finger or a component (for example, a stylus, not depicted), or moving the finger or the stylus near the input operation panel 5. The light emitted from the display screen 4a of the display device 4 passes through the input operation panel 5 and goes out ahead (outside) of the first housing 11 through the opening 11r of the wall portion 11k. The input operation panel 5 is an example of an input module.

The second housing 12, in the first embodiment, as an example, as illustrated in FIGS. 9 and 10, is configured in a quadrangular shape (a rectangular shape, as an example, in the first embodiment) in frontal view and in a back view. The second housing 12, in the first embodiment, as an example, is further configured as a flat rectangular parallelepiped shape. The second housing 12 comprises the surface 20 (a top surface, a front face, a first surface, or a first face portion) and a lower surface (a surface, a back surface, a second surface, or a second face portion, not depicted) on the opposite side of the surface 20. The surface 20 and the lower surface are approximately in parallel with each other. The second housing 12, as illustrated in FIGS. 9 and 10, further comprises four end portions 12c to 12f (sides or edge portions) and four corners 12g to 12j (protruding portions, rounded portions, or end portions) in a frontal view. The end portions 12c and 12e are examples of longer sides. The end portions 12d and 12f are examples of shorter sides.

The second housing 12 further comprises the wall portion 2 (a first wall portion, a plate, a frame, a front wall portion, a surface wall portion, or a top wall portion) having the surface 20 and a wall portion 12m (a second wall portion, a plate, a rear wall portion, a back wall portion, or a bottom wall portion, see FIG. 9) having the lower surface. The wall portions 2 and 12m are in a quadrangular shape (a rectangular shape, as an example, in the first embodiment). The second housing 12 further comprises four wall portions 12n (third portions, plates, side wall portions, end wall portions, standing wall portions, or span portions) having surfaces 12p (side surfaces, circumferential surfaces, third surfaces) extending between the wall portion 2 and the wall portion 12m. On the first housing 11 side (on the end portion 12c side) of the input receiver 1, a cover 12t is placed.

The first housing 11 and the second housing 12 can be composed of metallic or synthetic resin material, for example. On the inner side of the first housing 11 and the second housing 12, wall portions such as ribs (projecting portions or projecting wall portions, not depicted) can be provided. These wall portions facilitate an increase in the rigidity of the first housing 11 and the second housing 12.

In the first embodiment, as illustrated in FIGS. 9 and 10, connectors 14 can be provided on the surfaces 12p of the second housing 12, as an example. The connectors 14, for example, can be a connector for a power supply cable, a universal serial bus (USB) connector, a card connector, and connectors for earphones and a microphone. The connectors 14 are exposed through openings 12s provided on the wall portions 12n of the second housing 12.

In the first embodiment, as an example, as illustrated in FIG. 9, inside the second housing 12 and on the reverse side (a downside, a rear side, or the wall portion 12m side) of the input receiver 1, one or more of the substrates 6 (circuit substrates, control substrates, main substrates, electrical components, first electrical components) are housed. The substrates 6 are provided in parallel with the key module 3. The substrates 6 are provided in a condition away from the wall portions 2, 12m, 12n, and such, in other words, in a condition where spaces (clearances) are formed with the wall portions 2, 12m, 12n, and such.

In the first embodiment, as an example, on the substrates 6, for example, a plurality of components (not depicted) including a central processing unit (CPU), a graphics controller, power supply circuit components, a platform controller hub (PCH), a memory slot connector, an LCD connector, an input/output (I/O) connector, a power coil, elements, and connectors can be mounted. Furthermore, a control circuit can include, for example, a video signal processing circuit, a tuner, a high-definition multimedia interface (HDMI) signal processor, an audio video (AV) input terminal, a remote control signal receiver, a controller, a selector, an on-screen display interface, a storage module (for example, a read only memory (ROM), a random access memory (RAM), a hard disk drive (HDD), and a solid state drive (SSD)), and an audio signal processing circuit. The control circuit controls the output of video (such as movies or still pictures) on the display screen 4a of the display device 4, the output of audio from a speaker (not depicted), light emission of a light emitting diode (LED, not depicted), for example. The display device 4, the speaker, and the LED are examples of output modules.

In the first embodiment, as an example, as illustrated in FIG. 11, the inner side of the housing of the wall portions 12n of the second housing 12 is overlapped with the wall portions 2k and 2m (the wall portion 2k only is depicted in FIG. 11) of the input receiver 1. On the top portion 2n, a projecting portion 2u (a claw portion, a catching portion, or an engaging portion) jutting towards the outside of the housing over the wall portion 12n is provided. In the first embodiment, as an example, the projecting portion 2u overlapping the wall portion 12n in a thickness direction of the second housing 12 makes the wall portion 12n of the second housing 12 and the wall portion 2 of the input receiver 1 engage with each other in the thickness direction of the second housing 12. In accordance with the first embodiment, as an example, because the wall portions 12n overlap the wall portions 2k and 2m, the rigidity and strength of the wall portions 12n of the second housing 12 are likely to be increased.

Figure 12:
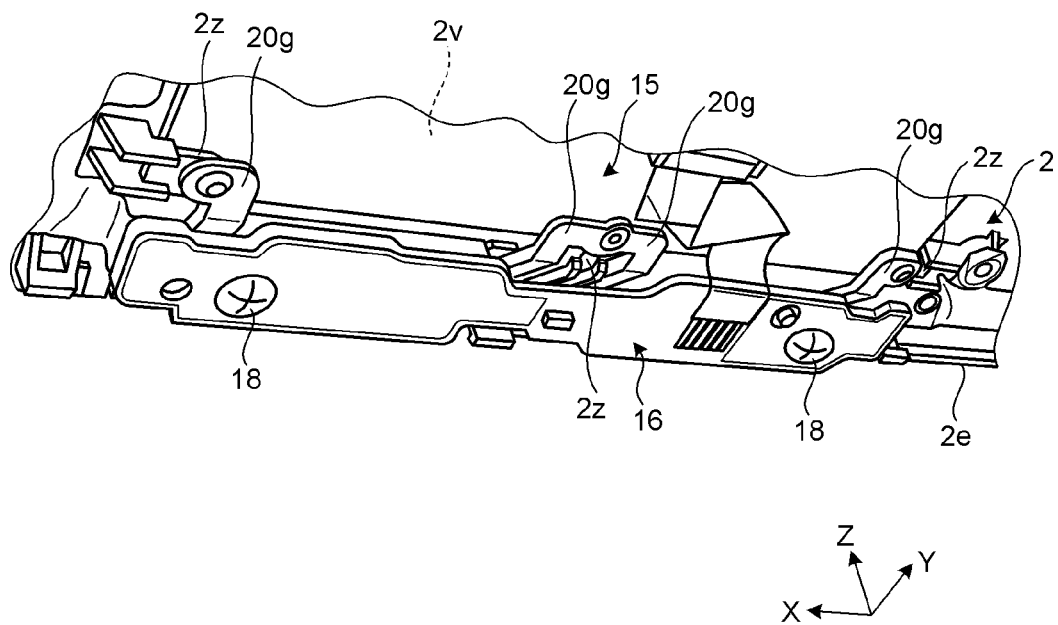
FIG. 12 is an exemplary perspective view of a portion of the wall portion of the input receiver as viewed from behind, in the first embodiment.
Figure 13:
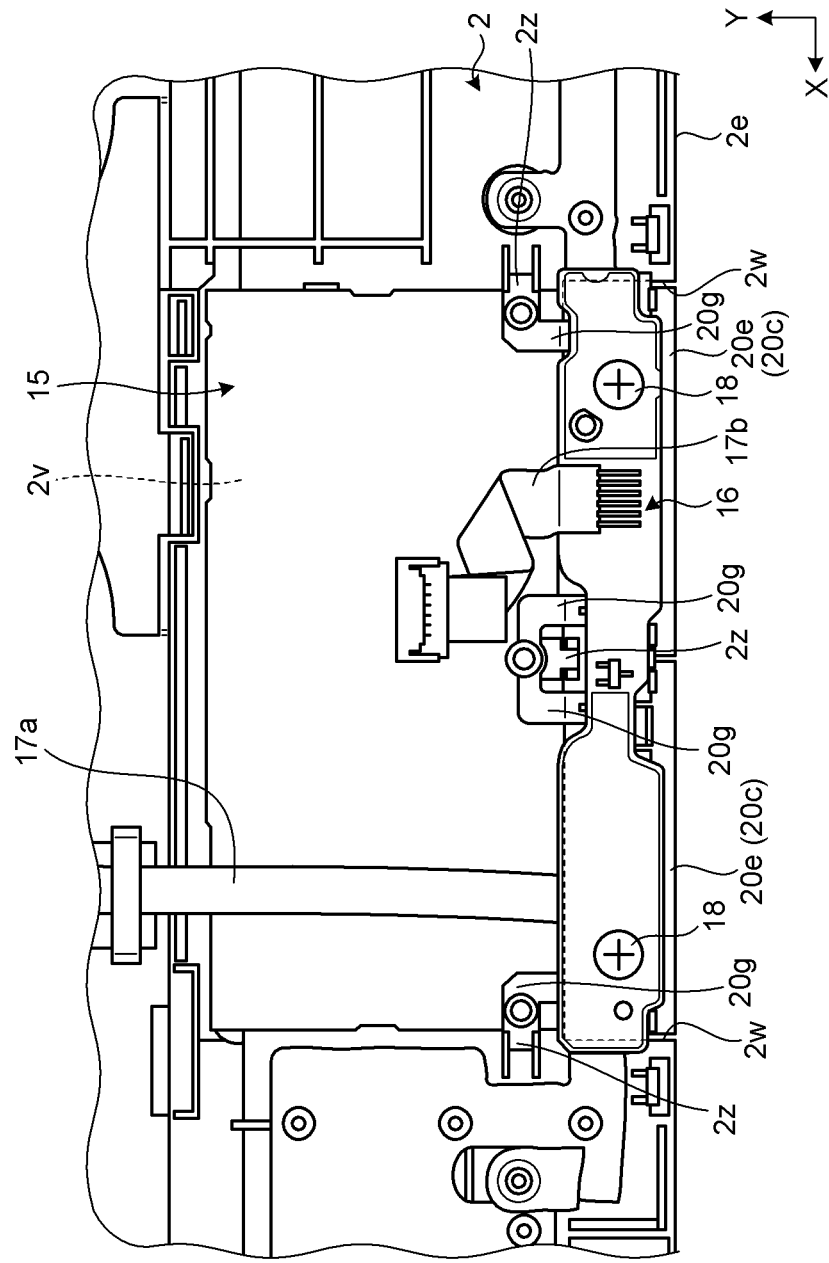
FIG. 13 is an exemplary plan view of a portion of the wall portion of the input receiver as viewed from behind, in the first embodiment.
Figure 14:
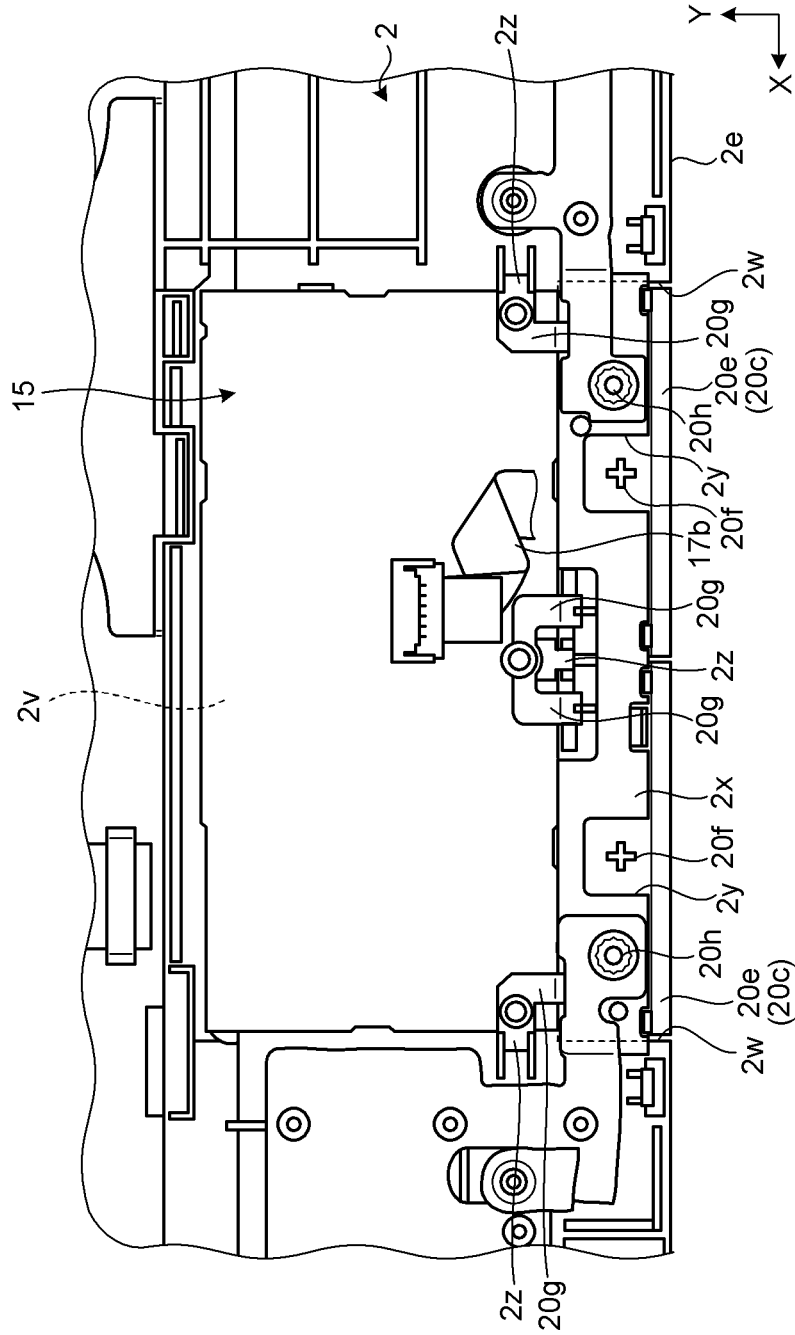
FIG. 14 is an exemplary plan view of a portion of the wall portion of the input receiver in FIG. 13 from which a substrate is removed, in the first embodiment.

In the first embodiment, as an example, as illustrated in FIGS. 12 to 14, on the reverse side of the portion of the wall portion 2 where the operation input module 20a is provided, two sensors 15 (a detecting module, or a touch sensor module) and a substrate 16 are provided. The sensor 15 has a size and a shape corresponding to the touch pad 20b and is formed in a quadrangular shape (a rectangular shape, as an example, in the first embodiment). The sensor 15 is provided on a rear surface 2v of the portion of the wall portion 2 where the touch pad 20b is provided, for example, by bonding. By the sensor 15, the movement of a finger, a component, and such on the touch pad 20b is detected. The surface of the sensor 15 on the surface 20 side is a detecting area Sa (see FIG. 2). More specifically, a portion of the sensor 15 extends further towards the opening 2a side (the end portion 2c side) than the palm rests 20d. The detecting area Sa is covered with at least a portion of the surface 20 and at least a portion of the surface 22. A signal in response to the detection result is fed to the substrates 6 in the second housing 12 via wiring 17a and 17b, wiring patterns of the substrate 16, and others. This configuration for transmitting signals between the sensor 15 and the substrates 6 in the second housing 12 via the substrate 16 facilitates, as an example, an increase in the degree of freedom in layout of the wiring 17a and 17b and various components.

In the first embodiment, as an example, operators 20e (movable portions, operating portions, or receiving portions) of the two click buttons 20c are housed in a cutout portion 2w (an opening, or a first opening) provided at the end portion 2e of the wall portion 2. In other words, the operators 20e are exposed through the cutout portion 2w. On the wall portion 2, a bridge portion 2x (see FIG. 14) is provided. The bridge portion 2x extends along the end portion 2e (in the longer direction or the X direction) between both ends of the cutout portion 2w at a position further towards the inner side of the housing (an off position in the thickness direction of the wall portion 2) than the cutout portion 2w. The substrate 16 is formed in a belt-like shape and has a width and a length corresponding to the bridge portion 2x. The substrate 16 can be attached to the reverse side of the bridge portion 2x (on the opposite side of the surface 20 or the inner side of the housing) via, for example, binding tools 18 (for example, screws), double-sided adhesive tapes, or adhesive. In the first embodiment, as an example, on the bridge portion 2x, binding portions 20h (for example, female screw holes) are provided. On the bridge portion 2x, cutout portions 2y (openings) are further provided. A projecting portion 20f provided on the operator 20e is provided corresponding to the cutout portion 2y. On the substrate 16, push switches (not depicted) are provided at the positions facing the projecting portions 20*f* through the cutout portions 2*y*. From the operator 20*e*, arm portions 20*g* (supporting portions or support portions) extend. The ends of the arm portions 20*g* are bound to arm portions 2*z* (supporting portions) provided on the wall portion 2 by welding or the like. The operator 20*e* of the click button 20*c* can go in and out (project and retract, be displaced, or go forward and back) as the arm portions 20*g* resiliently bend. Furthermore, as an example, the operator 20*e* is held at a position approximately in line with the surface 20 when no pushing force is applied. When the operator 20*e* is depressed towards the reverse side of the wall portion 2 (an inner side of the housing) by the user, the operator 20*e* is displaced to a position recessed from the surface 20 (a retracted position, a compressed position, or an inner side position) accompanied by elastic deformation of at least one of the arm portions 20*g* or the arm portions 2*z*. When the pressing force is released, the operator 20*e* returns from the retracted position to the initial position (an out position, or an outer side position) lying in line with the surface 20 by the elastic force of at least one of the arm portions 20*g* or the arm portions 2*z*. When the operator 20*e* is at the retracted position, the projecting portion 20*f* pushes the push switch.

As described above, in the first embodiment, as an example, the input receiver 1 comprises the wall portion 2 and the key module 3, and the key module 3 comprises the first area A1 in which the pitch of the keys 3*a* along the longer direction (the X direction) is constant and the second area A2 in which the distance between the keys 3*a* positioned on the end portion 2*d* side of the first area A1 in the longer direction and adjacent to one another in the longer direction is shorter than the pitch in the first area A1. Consequently, in accordance with the first embodiment, as an example, obtainable is the input receiver 1 in which the ease of typing on the keys 3*a* is not likely to be impaired even when the unit is down-sized.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. For example, as illustrated in a modification illustrated in FIG. 15, the sensor 15 provided on the rear surface of the surface 20 can project further towards the key module 3 side (the end portion 2*c* side) than the edge portion 21*a*1 of the surface 20 without providing the projecting portion 21*b* (see FIG. 1). Furthermore, the specifications (such as the construction, type, direction, shape, size, length, width, thickness, height, number of pieces, arrangement, position, and material) of each of the constituent elements can be implemented with appropriate changes.

What is claimed is:

1. An input receiver comprising:
 a cover comprising:
  one end; and
  an other end, wherein
   an opening is close to a side of the one end, and
   a palm rest and a receiving surface are close to a side of the other end;
 a key module, wherein
  a plurality of keys are exposed through the opening;
 a detector, wherein
  a detecting area capable of detecting an external input operation is covered with the receiving surface, and
 a button comprising a plurality of arms, wherein
  an end of each of the arms is bounded to an end of each of a plurality of support portions provided on the cover,
  the support portions are projected from an edge portion of the detector to a position where the arms are covered with the detector, and
  the button is off the cover and exposed.

2. The input receiver of claim 1, wherein tips of the keys are at about a same height as the palm rest.

3. The input receiver of claim 1, wherein the detecting area is attached to the cover via an adhesive member.

4. An electronic device comprising:
 a housing comprising a wall portion, wherein
  the wall portion comprises:
   one end; and
   an other end, wherein
    an opening is close to a side of the one end, and
    a palm rest and a receiving surface are close to a side of the other end;
 a key module, wherein a plurality of keys are exposed through the opening;
 a detector, wherein a detecting area capable of detecting an external input operation is covered with the receiving surface; and
 a button comprising a plurality of arms, wherein
  an end of each of the arms is bounded to an end of each of a plurality of support portions provided on the wall portion,
  the support portions are projected from an edge portion of the detector to a position where the arms are covered with the detector, and
  the button is off the wall portion and exposed.

* * * * *